(12) United States Patent
Morrison (10) Patent No.: US 8,357,232 B1
(45) Date of Patent: Jan. 22, 2013

(54) SYSTEM AND METHOD FOR GAS SEPARATION

(75) Inventor: Garrett L. Morrison, Unity, ME (US)

(73) Assignee: Casella Waste Systems, Inc., Rutland, VT (US)

( * ) Notice: Subject to any disclaimer, the term of this patent is extended or adjusted under 35 U.S.C. 154(b) by 928 days.

(21) Appl. No.: 12/400,628

(22) Filed: Mar. 9, 2009

(51) Int. Cl.
*B01D 45/12* (2006.01)

(52) U.S. Cl. ............... 95/271; 55/447; 55/467; 55/469; 55/471; 55/473; 55/460; 55/462; 55/451; 55/456; 55/459.1; 55/404; 55/408; 55/405; 55/406; 55/407

(58) Field of Classification Search ............ 55/447, 55/467, 469–471, 473, 460, 462, 451, 456, 55/459.1, 404–408; 95/271
See application file for complete search history.

(56) References Cited

U.S. PATENT DOCUMENTS

| | | | |
|---|---|---|---|
| 468,964 A * | 2/1892 | Cockrell ................... | 55/408 |
| 1,600,762 A * | 9/1926 | Hawley ..................... | 95/268 |
| 2,087,789 A * | 7/1937 | Allardice .................. | 55/415 |
| 2,182,862 A * | 12/1939 | Allardice ................. | 95/271 |
| 2,290,664 A * | 7/1942 | Allardice .................. | 55/398 |
| 2,394,173 A * | 2/1946 | Harris et al. ............. | 110/121 |
| 2,536,423 A | 1/1951 | Cohen et al. | |
| 2,569,710 A * | 10/1951 | Fitzpatrick ............... | 55/396 |
| 3,234,716 A * | 2/1966 | Sevin et al. .............. | 210/360.1 |
| 3,535,854 A * | 10/1970 | Taylor ...................... | 55/338 |
| 3,548,568 A * | 12/1970 | Carlson, Jr. et al. ...... | 95/218 |
| 3,672,503 A * | 6/1972 | Mark ........................ | 209/722 |
| 3,998,610 A | 12/1976 | Leith et al. | |
| 4,070,171 A | 1/1978 | Wikdahl et al. | |
| 4,093,427 A | 6/1978 | Schlenker | |
| 4,108,778 A * | 8/1978 | Lambert et al. ........... | 210/297 |
| 4,135,898 A | 1/1979 | Rosengard et al. | |
| 4,285,701 A | 8/1981 | Schlenker | |
| 4,361,490 A | 11/1982 | Saget et al. | |

(Continued)

FOREIGN PATENT DOCUMENTS

| WO | WO-9711310 | 3/1997 |
|---|---|---|
| WO | WO-01/36103 | 5/2001 |

(Continued)

OTHER PUBLICATIONS

Wissen, R. et al. "Gas Configuration with Wall Condensation," AIChE Journal, 52:3, p. 1271-1274 (Mar. 2006).

(Continued)

*Primary Examiner* — Jason M Greene
*Assistant Examiner* — Dung H Bui
(74) *Attorney, Agent, or Firm* — Wilmer, Cutler, Pickering, Hale and Dorr LLP (57) ABSTRACT

The present invention relates to a system and method for the separation of gaseous components from gaseous mixtures in order to control emissions and treatment of the gaseous components. In one embodiment, the system makes use of a fan or gas moving device to first impose centrifugal forces on gas streams as the gas moves from the center of the fan toward the periphery of the fan housing. Heavier gases are forced to the outer regions of the fan housing while lighter gases remain closer to the fan axis. The heavier gases and lighter gases exiting the fan housing flow into a duct at different flow rates, and the heavier gases are diverted from the larger volume gas streams and then processed.

25 Claims, 4 Drawing Sheets

U.S. PATENT DOCUMENTS

| | | | |
|---|---|---|---|
| 4,373,941 A | | 2/1983 | Lagelbauer |
| 4,478,718 A | * | 10/1984 | Saget .................. 210/512.3 |
| 4,561,966 A | | 12/1985 | Owen et al. |
| 4,585,466 A | * | 4/1986 | Syred et al. ................. 55/349 |
| 4,969,934 A | * | 11/1990 | Kusik et al. ................. 95/270 |
| 5,024,739 A | | 6/1991 | Maya |
| 5,024,741 A | | 6/1991 | Maya |
| 5,180,407 A | | 1/1993 | DeMarco |
| 5,293,860 A | * | 3/1994 | Tomlinson et al. ....... 126/110 R |
| 5,476,537 A | | 12/1995 | Yi et al. |
| 5,496,394 A | | 3/1996 | Nied et al. |
| 6,716,269 B1 | | 4/2004 | Graff et al. |
| 6,890,375 B2 | * | 5/2005 | Huber ........................... 95/271 |
| 6,896,720 B1 | * | 5/2005 | Arnold et al. ................ 95/271 |
| 2006/0230933 A1 | | 10/2006 | Harazim |
| 2007/0227105 A1 | * | 10/2007 | Jacobson ...................... 55/345 |
| 2007/0227357 A1 | | 10/2007 | McDermott |

FOREIGN PATENT DOCUMENTS

| | | |
|---|---|---|
| WO | WO-02/068094 | 9/2002 |
| WO | WO-2004/091799 | 10/2004 |

OTHER PUBLICATIONS

Morrison, Dr. Garrett L., U.S. Department of Energy, Innovative Clean Coal Technology Demonstration Project, "Passamaquoddy Technology Recovery Scrubber Public Design Report," Passamaquoddy Innovative Clean Coal Technology Program, Cooperative Agreement No. DE-AC22-90PCP89657, Portland, ME. (Issue Date, Dec. 20, 1989) (65 Pages).

* cited by examiner

FIG. 1 (SIDE VIEW)

FIG 2 (TOP VIEW)

SYSTEM AND METHOD FOR GAS SEPARATION

FIELD OF THE INVENTION

The present invention generally relates to gas separation and, more particularly, is concerned with systems and method for gas separation for control of emissions and treatment of gas constituents.

BACKGROUND OF THE INVENTION

Release of waste industrial gases, landfill gases, and/or combustion products or byproducts to the atmosphere may be regulated for safety or to protect the environment and, therefore, have limits established on the quantity of one or more gases that may be released to the environment. Major components of landfill gas are methane, carbon dioxide and nitrogen. There are also minor amounts of oxygen, other organic compounds, halides and hydrogen sulfide. Landfill gases, which present a potential renewable energy source, are believed by many scientists to contribute to the greenhouse effect. At present, landfill gases are dealt with by venting to the atmosphere; burning in boilers; flaring; fueling gas turbine or internal combustion engine-driven generators; or as a fuel substitute with or without gas components other than methane.

Landfill gas is seen to be a potential source of carbon dioxide, and also as a potential source of natural gas. Several prior art techniques disclose processes for purification of landfill gas to recover carbon dioxide from landfill gas. Some of these processes also remove impurities such as sulfur compounds, halogens, water, and the like. Other processes involve treatment of landfill gas by converting hydrogen sulfide ($H_2S$) to sulfur dioxide ($SO_2$) in a burner. The sulfur dioxide is then transported to a bed of lime wherein the sulfur is deposited. A disadvantage of this system is that the sulfur containing byproducts can deposit in the transfer lines and can cause an increase in pressure within the system.

In other methods of controlling or reducing the quantity of some gases released, gases may be scrubbed of sulfur dioxide or nitrogen oxides (capture and removal of a gas is commonly referred to as scrubbing) to reduce the quantity released after the landfill gas is combusted. These methods may operate by causing a chemical reaction between the gas and other substances. For example, gases may be reacted with sulfur dioxide, calcium carbonate (or limestone), water, oxygen or mixtures thereof to form a dissolved or precipitated solid containing the captured sulfur, which can be collected using known techniques. In some instances gaseous pollutants, such as oxides of nitrogen, can be reacted with other gases or liquids to form new compounds including other gases or liquids. The reaction between nitrogen oxides, ammonia gas, or ammonium hydroxide solution can form nitrogen ($N_2$) gas and water which can be released to the atmosphere without harm to the environment. In some cases, gases such as hydrogen sulfide ($H_2S$) may be reacted with oxygen to form sulfur dioxide ($SO_2$). In other cases, gases such as hydrogen sulfide ($H_2S$) may be reacted with oxygen with the aid of sulfur oxidizing bacteria to form elemental sulfur, which can be captured and collected to reduce emissions.

All such methods rely on use of reactants such as limestone, ammonia, oxygen, or other chemicals to separate, capture, sequester, or convert the gas to be controlled into a form more suitable for recovery and sale, or for disposal. Most of these reactants form a substantial part of the cost for control of emissions, in addition to the high cost to cause the reactants and the gases to come into intimate contact with each other so that the desired reactions can take place.

Kinetic theories have predicted that a partial separation of constituents of a gaseous mixture will occur when the mixture is subjected to a pressure gradient. Industrial processes for separating individual fractions of mixtures on the basis of a pressure gradient are not widespread. In order to obtain sufficient separation between components of a gaseous mixture, relatively steep pressure gradients are required. In the past, large pressure gradients can be achieved in a gaseous mixture using a standard gas centrifuge. Other devices utilizing pressure diffusion sometimes include a separation nozzle, particularly for enrichment of isotopes of uranium.

Some methods of separation of gaseous mixtures into their component fraction use the differences in the molecular weights or density of the gases in the mixture to facilitate the separation. The difference in masses of the gases gives rise to a difference in diffusion rate, and this has been utilized in the separation or enrichment of isotopes, such as uranium. In these methods, a mixture of gases is impinged on a porous membrane in which the pores are small enough for lighter molecules to pass more readily through the pores than the heavier ones. The mixture can thus be separated by flowing it along the membrane surface; the portion that passes through is enriched as the lighter component, and the portion that does not is enriched as the heavier component.

In gas mixtures comprising uranium isotopes the density difference (using $UF_6$ gas) between $U^{235}$ and $U^{238}$ is less than 1% of the total gases in the mixture. That is, $UF_6$ gas with the heavier isotope is 1.00859 times heavier than the $UF_6$ gas with the lighter isotope. Because the density difference in these uranium isotopes is small, several repetitions of the separation process are required to achieve the desired degree of separation. In contrast, the density differences between gases in pollutants and/or industrial waste gases are greater. For example: sulfur dioxide gas is approximately 3.5 times heavier than water vapor; sulfur dioxide gas is approximately 1.46 times heavier than carbon dioxide gas; carbon dioxide gas is approximately 2.74 times heavier than methane gas; and carbon dioxide gas is approximately 1.29 times heavier than hydrogen sulfide gas.

For gas mixtures with gases having larger differences in molecular weight or density, gas centrifuges have been used in separating these gases from gaseous mixture. Typical or standard gas centrifuge includes a tall vertical rotary cylinder fed with the gas mixture to be separated. The cylinder is rotated about its axis at a high angular velocity. The rotation of the cylinder causes the gas mixture to increase its angular rotational velocity so that the lighter components of the mixture move toward the axis and the heavier components of the mixture move toward the wall. Under standard conditions, significant high-purity separation is difficult to achieve unless the rotational velocity is extremely high. In another method for separation of gases, separation nozzles have been used. Separation nozzles induce a pressure gradient in a curved expanding supersonic jet to achieve separation of a gas mixture. The power consumption of separation nozzles is significant relative to the separation achieved. In centrifugal gas separation devices, such as countercurrent gas centrifuges and expanding jet or separation nozzle centrifuges, many stages cascaded together have often been required in order to obtain the desired separation.

Another device sometimes suggested for gas-gas separation includes a vortex tube or a vortex chamber separator in which a fluidic separation process results from centrifugal forces used for separating or precipitating a denser disperse phase from a lighter phase with continuous flow. Vortex chamber separators have the disadvantage of relatively lower separating efficiency relative to the energy requirement, primarily because of high flow resistance in the vortex chamber and also the use of multi-chamber systems with relatively high volume.

Consequently, a need exists for improvement in separation of gaseous components from gaseous mixtures in order to control emissions. There is a critical need for a cost-effective system for removing gaseous pollutant species from gaseous mixtures, such as landfill gas.

SUMMARY OF THE INVENTION

The present invention provides a system and method for the separation of gaseous components from gaseous mixtures in order to control emissions and treatment of the gaseous components. In one embodiment, the invention makes use of a fan or gas moving device to first separate component gases from larger volume gas streams and then process smaller gas streams for capture or treatment of those gases. The separation is afforded by the reactive centrifugal forces imposed as the gas moves from the center of the fan toward the outer periphery where heavier gases are forced to the outer regions of the fan housing while lighter gases remain closer to the fan axis. The separation of gas streams based on molecular weight of the gas provides the opportunity to treat or interact with only a portion of a gas stream to reduce the cost of processing the gas.

The main advantage is cost reduction afforded by reduction in the volume of gas handled and reduction in the quantity of reactants needed to make adequate contact with the full volume of the full gas stream. An additional advantage will be the ability to separate specialty gases such as siloxanes from landfill gas. Other methods are known including cooling siloxanes to very low temperatures to condense the siloxanes, or use of activated carbon or other adsorber to collect the siloxanes. The density separation is less expensive. An additional advantage for landfill gas is the potential to concentrate methane so that the engines or turbines using the recovered methane can be run on higher quality gas. An additional advantage is the potential for removing nitrogen gas from landfill gas.

Accordingly, one aspect of the present invention provides a method for separating a plurality of gas components from a gas mixture by action of centrifugal forces, which include the operative steps of receiving the gas mixture in one axial direction; accelerating the gas mixture in another radial direction by action of the centrifugal forces; forcing the plurality of gas components through a first gas discharge outlet; and feeding at least one of the plurality of gas components from the first discharge outlet through a second gas discharge outlet.

In certain embodiments, the method further includes the step of separating at least one gas component from the plurality of gas components forced through the first gas discharge outlet. In some embodiments, the separating step further includes guiding the at least one of the plurality of gas components forced through the first gas discharge outlet against a baffle surface. In other embodiments, the method further includes the step of feeding the plurality of gas components remaining after separating the at least one gas component to the gas mixture being received. In still other embodiments, the molecular weight of the at least one gas component of the plurality of gas components is the heaviest in the gas mixture.

In some embodiments, the gas mixture is drawn through an inlet pipe by induced draft.

In certain embodiments, the step of receiving the gas mixture comprises drawing the gas mixture in one axial direction by suction. In another embodiment, the step of receiving the gas mixture comprises forcing the gas mixture in one axial direction by pressure. The pressure may be applied by at least one of fan, pump, and blower.

In another aspect, the invention provides a method of separating a plurality of gas components from a gas mixture by action of centrifugal forces, which include the operative steps of receiving the gas mixture into a centrifugal fan device in an axial direction through an inlet duct; accelerating the gas mixture in a radial direction by action of centrifugal forces to form a plurality of gas streams, wherein each gas stream comprises at least one of the plurality of gas components; forcing the plurality of gas streams through a first discharge outlet; guiding at least one of the plurality of gas streams forced through the first discharge outlet against a baffle surface, wherein contact with the baffle surface forces the at least one gas stream out of the first discharge outlet through a second discharge outlet; and conducting the remaining of the plurality of gas streams out of the first discharge outlet through a third discharge outlet.

In certain embodiments, the method further includes the step of feeding at least a first portion of the plurality of gas streams discharged through the third discharge outlet to the gas mixture being received into the centrifugal fan. In some embodiments, the at least one gas stream may be discharged through the second discharge outlet comprises the at least one gas component having the highest molecular weight in the gas mixture. In other embodiments, the step of receiving the gas mixture into the centrifugal fan comprises drawing the gas mixture in the axial direction by suction. In still other embodiments, the step of receiving the gas mixture into the centrifugal fan comprises forcing the gas mixture in the axial direction by pressure. The pressure may be applied by at least one of fan, pump, and blower.

In another aspect, the invention provides a system for separating a plurality of gaseous components from a gaseous mixture, which includes a centrifugal fan device including a centrifugal fan having an axis and acting as a rotatably driven pump impeller. The centrifugal fan device includes an inlet for receiving gas mixture, wherein the inlet is located in the vicinity of the axis of the centrifugal fan, and a gas outlet position tangentially on fan periphery for forcing gas out of the fan housing at an accelerated velocity; a discharge outlet in the vicinity of the centrifugal fan periphery for receiving the forced gas from the centrifugal fan, wherein the discharge outlet is located centrally relative to the centrifugal fan gas outlet; and a baffle surface positioned on the periphery of the first gas discharge outlet for guiding at least one gas component of the plurality of gas components through a second discharge outlet.

In certain embodiments, the length of the discharge outlet is from about 15 feet to about 25 feet. In some embodiments, the axis of the discharge outlet form a curvature comprising an interior angle of about 60 degrees. In other embodiments, the axis of the discharge outlet form a curvature comprising an interior angle of about 90 degrees.

In certain embodiments, the system further includes a drive for the centrifugal fan. The drive may be an electric motor, a belt drive, or a variable drive.

In some embodiments, the centrifugal fan is an induced draft fan. The induced draft fan can further include a hub; and an impeller comprising a plurality of blades, each of the blades, without directly contacting the hub, spaced about an axis of rotation, wherein air enters axially through an upstream end of the fan and is discharged radially from the fan.

DETAILED DESCRIPTION

As used throughout the disclosure, the term "mechanical draft fan", unless otherwise indicated, refers to large diameter centrifugal fan for moving air or other gases.

Figure 1:
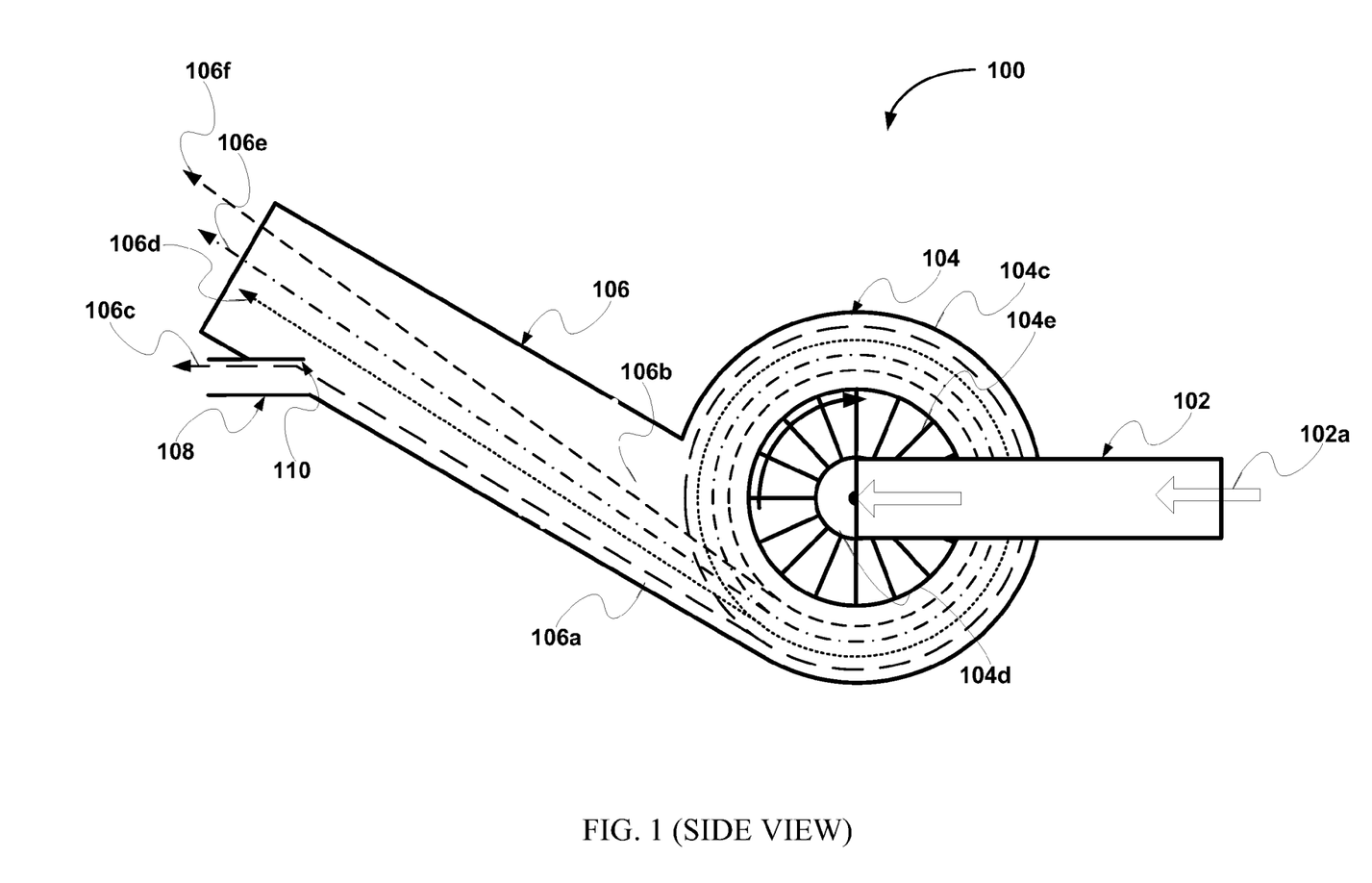
FIG. 1 illustrates the side view of an exemplary system in accordance with an embodiment of the present invention for separating gaseous components from a mixture of gases.

Referring now to the drawing, and more particularly, to FIG. 1, there is shown a system for separating gaseous components from a mixture of gases, generally designated 100, which comprises the preferred embodiments of the present invention. System 100 includes an inlet duct 102, an mechanical draft fan 104, an outlet duct 106, a discharge outlet duct 108, and a baffle 110. Exemplary mechanical draft fans include induced draft fan, forced draft fan, balanced draft fan, and the like.

In one embodiment of the present invention, inlet duct 102 is connected in a conventional manner to a gas source, such as a landfill. Inlet duct 102 carries a gas stream 102a (e.g. landfill gas) from the gas source to inlets 104a-b of mechanical draft fan 104, a shown in FIG. 2.

Figure 2:
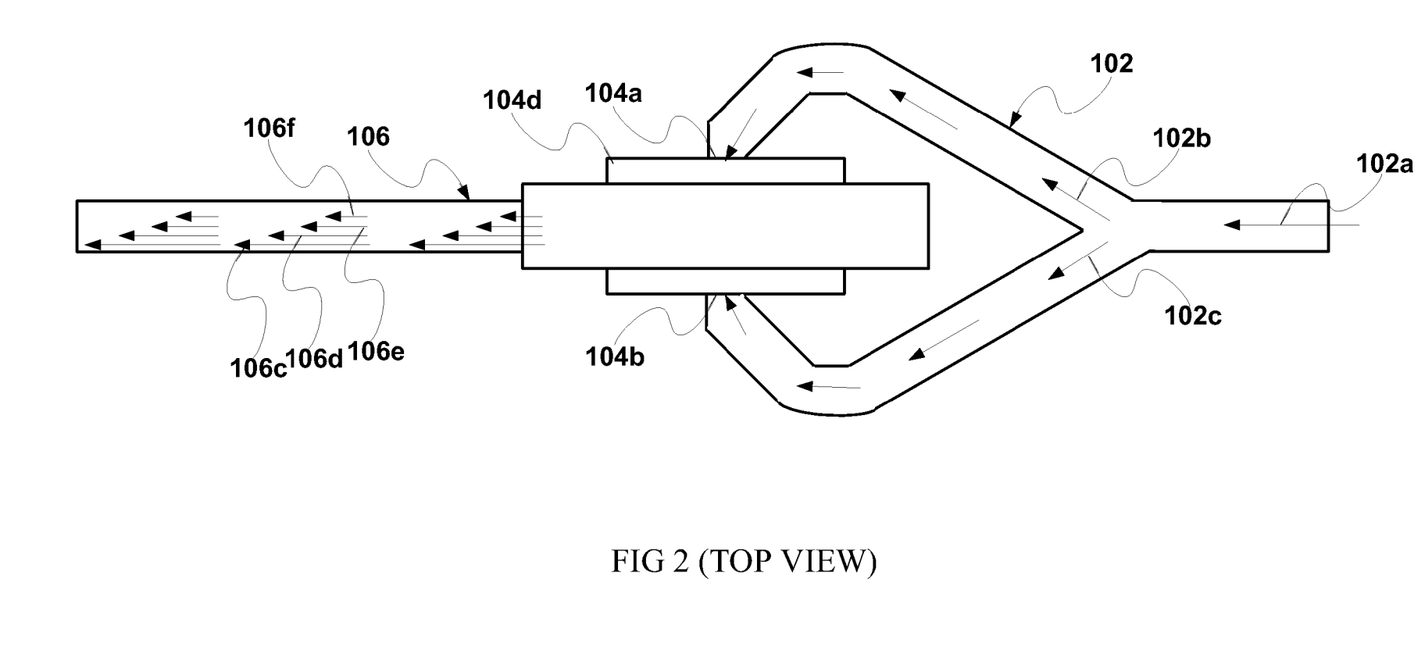
FIG. 2 illustrates the top view of an exemplary system in accordance with an embodiment of the present invention for separating gaseous components from a mixture of gases.

Mechanical draft fan 104 is positioned between inlet duct 102 and an outlet duct 106 and receives gas stream 102a from a gas source. Mechanical-draft fan 104 in accordance with one embodiment of the present invention comprises of a casing/housing 104c, a fan drive mechanism 104d, and a fan blades unit 104e. Fan drive mechanism 104d comprises a motor mount on the inside at the center. Fan drive mechanism 104d and fan blades unit 104e are mounted inside casing 104c. In one embodiment, fan blades unit 104e is coupled to a drive shaft of fan drive mechanism 104d.

Fan drive mechanism 104d drives fan blades unit 104e. Fan drive mechanism 104d also determines the speed of the fan blades unit 104e and the extent to which this speed can be varied. In one embodiment, fan drive mechanism 104d is a direct drive mechanism. In the direct drive mechanism, fan blades unit 104e can be linked directly to the shaft of an electric motor. This means that the fan speed is identical to the motor's rotational speed. In another embodiment, the drive mechanism is a belt drive mechanism in which fan blades unit 104e may be driven by a belt drive. The belt driven fans use multiple belts that rotate in a set of sheaves mounted on the motor shaft and fan blades unit 104e shaft. The belts transmit the mechanical energy from the motor to the fan. The fan speed depends upon the ratio of the diameter of the motor sheave to the diameter of the fan wheel sheave. In yet another embodiment, the drive mechanism is a variable drive mechanism in which variable drive fans use hydraulic or magnetic couplings (between the fan wheel shaft and the motor shaft) that allow control of the fan speed independent of the motor speed. In some embodiments of the present invention, fan drive mechanism 104d speed controls can be integrated into automated systems to maintain the desired fan wheel speed. An alternate method of varying the fan speed is by use of an electronic variable-speed drive which controls the speed of the motor driving the fan. This offers better overall energy efficiency at reduced speeds than mechanical couplings.

Fan blades unit 104e comprises a fan wheel (or impeller) composed of a plurality of fan blades, or ribs, mounted around a hub, and is connected between the periphery of the motor mount and extends toward, but not always to, the inside wall of casing 104c. In some embodiments, the fan wheel has a circular profile and a center-mounting rod disposed on the inside. The blades are radially spirally arranged around the circular peripheral surface of the fan wheel, each having a top wind cut face and a bottom side edge disposed in flush with the bottom edge of the circular peripheral surface of the body. In one embodiment, the fan blades on fan blades unit 104e are arranged with a forward-curve. Forward-curved blades use blades that curve in the direction of the fan blades unit's 104e rotation. Forward-curved blades are generally used for high flow, low pressure applications. In another embodiment, the fan blades on fan blades unit 104e are arranged with a backward-curve. Backward-curved blades use blades that curve against the direction of the fan blades unit's 104e rotation. Backward-curved fans are generally more energy efficient than radial blade fans, and are thus generally used for high pressure, low flow applications. In yet another embodiment, the fan blades on fan blades unit 104e are arranged as radial fan blades. Radial fan blades extend straight out from the center of fan blades unit 104e.

In some embodiments of the present invention, fan dampers can be used to control gas flow into mechanical draft fan 104. Fan dampers may be installed on the inlet side of fan 104. Dampers on the inlet side are designed to control gas flow, and/or to change how the gas enters the fan wheel. In other embodiments of the present invention, wing guides can be used to guide currents of air forward, forming an eddy flow of air. The wing guides can be spirally curved in direction reversed to the curving direction of the blades of the fan blades unit.

Referring again to FIG. 1, during operation of system 100, mechanical draft fan 104 receives a gas stream to be separated, such as gas mixtures from a landfill, a hot asphalt mix plant, cement plant, foundry, coal fired boiler, or the like, into mechanical draft fan 104 via the inlet duct 102. In one embodiment of the present invention, mechanical draft fan 104 induces a negative pressure and draws a gas stream to be separated. In other embodiments of the present invention, gas stream to be separated is forced into fan 104 by pressure. Exemplary methods of forcing gas stream by pressure include the use of a fan, pump, blower (upstream from centrifugal fan), and the like. In one embodiment, gas stream 102a enters the fan wheel axially, turns 90 degrees and accelerates due to centrifugal force as it flows over fan blades unit 104e and exits fan housing 104c. Before entering fan 104, the gas stream 102a can be optionally split into two streams 102b-c, as shown in FIG. 2, to increase the volume of gas flow through fan 104 without increasing the inlet diameter. As an advantage, splitting gas stream 102a into to streams 102b-c would avoid a need to decrease the length of blades 104e or an increase in the diameter of fan 104. The rotation of the fan wheel causes gas to be pulled into the fan at or near the axis and to be expelled from the fan blades and into fan housing 104c at the periphery for discharge at outlet duct 106. In one embodiment, fan 104 may have a horizontal axis and a diameter of about 6 feet.

In the embodiment shown, draft fan 104 induces negative pressure to draw landfill gas, or other gas streams to be cleaned, through the assembly of this invention. By way of illustration and not limitation, the system depicted and described herein would be capable of cleaning between about 600 and 3000 cubic feet of gas per minute thus, mechanical draft fan 104 would be able to convey between about 600 and 3000 cubic feet of gas per minute at an intake negative pressure of between about 7 and 15 inches water column. Increasing or decreasing blade size, blade geometry, fan diameter, and/or fan rotation rate of fan blades 104e could decrease the gas flow or increase it to millions of cubic feet per minute and decrease or increase the negative pressure to any desired value.

The fan blades of fan blades unit 104e must be rotated at adequate revolutions necessary to achieve the gas flow and forces required to impact high molecular weight and low molecular weight gases differently. In one embodiment of the present invention, the fan blades of fan blades unit 104e may be rotated at 650 revolutions per minute. The centrifugal forces generated by fan blades unit 104e cause the heavier molecular weight gases to diffuse towards the periphery of fan housing 104c, and exit fan housing 104c along the periphery of housing via outlet duct 106. The lighter molecular or atomic weight gases 106d-f diffuse into the central or core portion of outlet duct 106. In some embodiments, fan 104 can generate pressure rises in the gas stream causing core portion 106b of outlet duct 106 to be at a lower gas pressure than peripheral portion 106a of outlet duct 106.

Separated gas streams exit via distal end of outlet duct 106, wherein a first, second or other portions of the gases are removed. In one example of the present invention, the angle between the axis of outlet duct 106 and a perpendicular axis is about 35 degrees. In another example of the present invention, the angle between the axis of outlet duct 106 and a perpendicular axis is about 45 degrees. In yet another example of the present invention, the angle between the axis of outlet duct 106 and a perpendicular axis is about 60 degrees. In other embodiments, the angle of outlet duct 106 can be any angle that is suitable to connect to any downstream equipment. In such embodiments, gas flows at an angle dictated by outlet duct 106 until the gas with higher molecular weight reaches baffle 110.

In one embodiment of the present invention, outlet duct 106 has a diameter of about 1 m, and preferably 0.5 m or less, and still more preferably between 0.5 m and 0.1 m. The length of outlet duct 106 together with the diameter determines the residence time of the gases therein. The gas flow should be maintained as laminar flow at least until the gas has reached baffle 110 and other successive baffles for the desired separations. Accordingly, the length and diameter are selected to give outlet duct 106 of the determined volume for the separation. In one example, the length of outlet duct 106 is from about 0.5 m to about 1 m.

In other embodiments of the present invention, the gas stream from outlet duct 106 can be split into two streams. Each of the split gas stream can enter different downstream equipment. In other embodiments of the present invention, one or more gas outlets 106 from one or more mechanical draft fans 104 can be connected to one or more downstream equipment (e.g., a stack) and may be uniformly spaced, if there is more than one, for initiation of a uniform flow.

Upon passing through the fan and entering duct 106, heavier molecular weight or atomic weight gases diffuse towards the periphery 106a of outlet duct 106, as shown in FIGS. 1 and 2. Lighter molecular or atomic weight gases diffuse into the central portion 106b of duct 106 or into the portion of duct 106 that is away from the dense gases. Under these operating conditions, it is possible to isolate a higher molecular weight gas fraction 106c in a peripheral portion 106a of duct 106, and lower molecular weight gas fractions 106d-f in the remaining portion of duct 106.

Upon entering duct 106, heavier molecular weight gas 106c flowing along the periphery 106a of the duct housing is diverted by baffle 110 to a discharge outlet duct 108. Baffle 110 extends from inside the duct housing into a discharge outlet duct 108. The diverted gas stream 106c exits outlet duct 106 via discharge outlet duct 108 and can be collected in a gas storage unit for disposal or use. In alternative embodiments of the present invention, successive additional baffles may be placed along outlet duct 106 in order to separate remaining components of the separated gas stream 106d-f. In such embodiments of the present invention, diameter of outlet duct 106 decreases along its longitudinal axis to form a conical shape. Narrowing of outlet duct facilitates each successive baffle to reach a component gas stream and divert the component gas stream associated with each baffle. In one example, if outlet duct 106 is conical in shape, diameter of duct 106 varies from about 0.1 mm at one end to about 1 m at the other end.

Figure 3:
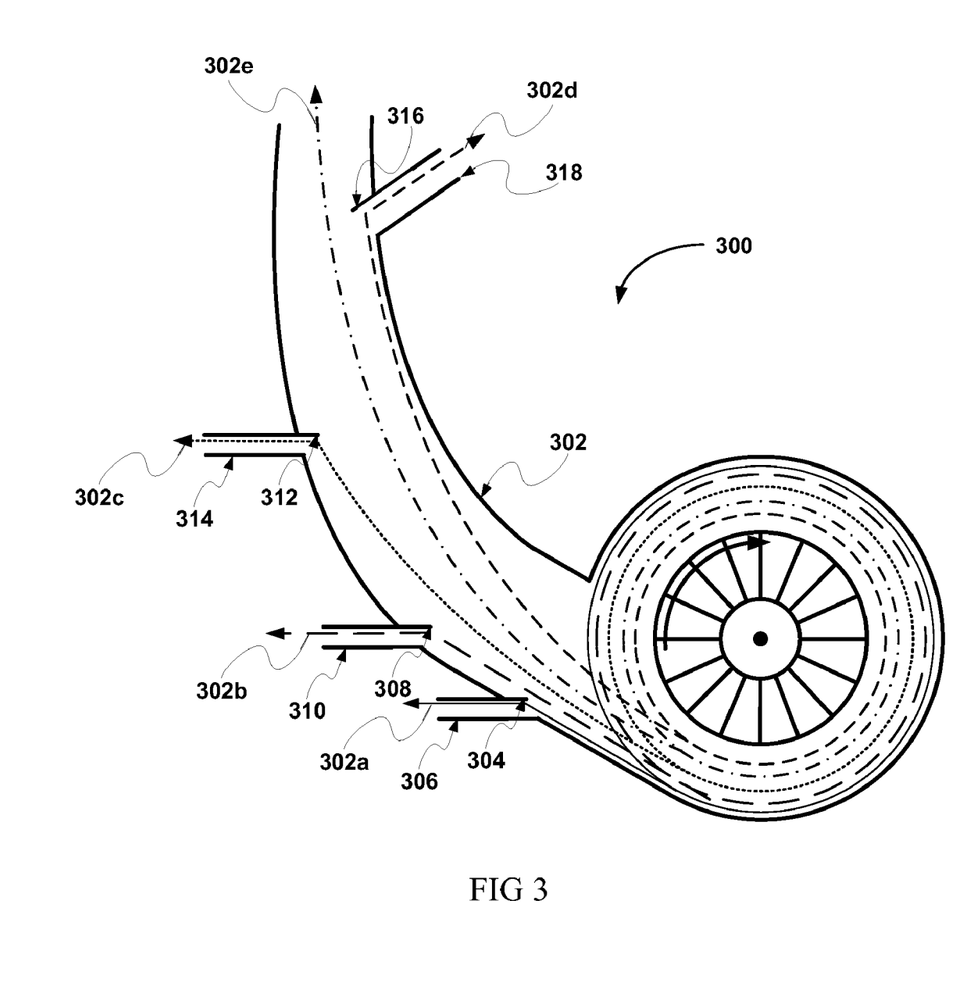
FIG. 3 illustrates an exemplary outlet duct from a gas separating system in accordance with the present invention.

FIG. 3 illustrates an exemplary embodiment of the present invention, in which, outlet duct 302 may be curved in order to increase the residence time while gases are subjected to a continuing centrifugal effect. For example, outlet duct 302 may be curved over a length of about 15 feet to about 25 feet such that the interior angle of the curved outlet duct 302 may be from about 60 degrees to about 90 degrees. Curvature of outlet duct 302 would subject the flowing gases to a smooth and steady change in direction over the curved length of duct 302. Direction change over the curved length of duct 302 causes the gas to remain subjected to the centrifugal forces for a time interval greater than the time the gas is subjected to the centrifugal forces during one revolution of the fan 104. The additional residence time coupled with continued centrifugal forces on the gas components in the curvature of outlet duct 302 allows for continued diffusion of heavier gas components toward the outside of the curvature of outlet duct 302. Gas components diffusing to the wall of outlet duct 302 may be diverted from the mix.

In some embodiments of the present invention, successive baffles placed along outlet duct 302 in order to separate components of a separated gas stream 302a-e. As shown in FIG. 3, a first baffle 304 may be placed along the periphery of outlet duct 302 to divert heavier gas component stream 302a from gas stream 302a-d to a first discharge outlet duct 306. A second baffle 308 can be placed in outlet duct 302, downstream from baffle 304, to divert medium weight gas stream 302b to a second discharge outlet duct 310. A third baffle 312 can be placed in outlet duct 302, downstream from second baffle 308, to divert light medium weight gas streams 302c to a third discharge outlet duct 314. A fourth baffle 316 can be placed in outlet duct 302, downstream from third baffle 312, to divert lightest weight gas streams 302d to a fourth discharge outlet duct 318. Remaining gas stream 302e exits at the distal end of outlet duct 302.

In accordance with an embodiment of the present invention, it has been determined that gaseous mixtures of components differing in molecular or atomic weight can be separated into component fractions according to molecular or atomic weight by subjecting the gaseous mixture to centrifugal force via a centrifugal fan having a diameter of about 2 m at a gas feed absolute pressure of from about −5 to about −50 inches of water column at the inlet of the fan. In alternate embodiments, the inlet gas stream may be forced into the fan inlet under pressure and may be further accelerated by action of the fan. Where pressure is applied to force gas into the fan inlet, the gas feed pressure may be above the inlet pressure created by the action of the centrifugal fan acting alone and below the pressure at which any component of the gas may condense to become a liquid or solid.

Figure 4:
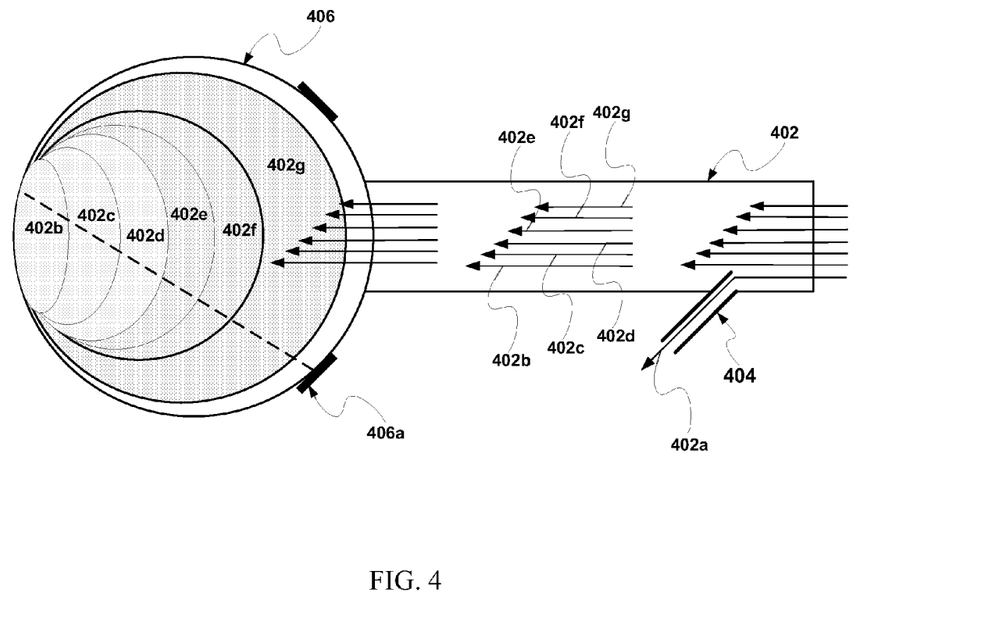
FIG. 4 illustrates an exemplary separation of landfill gas into its gaseous components using an embodiment in accordance with the present invention.

FIG. 4 illustrates an exemplary separation of landfill gas into its gaseous components using an embodiment in accordance with the present invention. In this example, outlet duct 106 is connected to a stack 406 in an upward angle such that separated gas streams exiting via distal end of outlet duct 106 enter stack 406 at an upward angle. FIG. 3 shows the top view of separated gas streams 402a-f entering stack 406 from outlet duct 106 of mechanical draft fan 104. Mechanical draft fan 104 generates sufficient centrifugal force ("the centrifugal effect") to separate heavier gas molecules from the lighter gas molecules. As shown in FIG. 4, the landfill gas is roughly separated into its components gases, such as siloxanes, $CH_4$, $N_2$, $CO_2$, $O_2$, CO and $H_2S$. Prior to entering stack 406, gaseous siloxanes 402a are separated from gaseous mixture 402a-g via discharge outlet 404. FIG. 4 shows that the heaviest component ($CO_2$) diffuses to the periphery of the stack wall (shown by region 402b of the stack chamber), followed by the next heaviest component ($H_2S$) in region 402c of the stack chamber, and followed by the remaining components according to their molecular weights in regions 402d-g of the stack chamber. Table 1 summarizes the separation of the gaseous components of one landfill gas mixture into regions 402b-g of the stack chamber. Measurements for determining the weight fractions of separated gas in stack 406 can be performed by inserting sensing probes radially into stack 406 through ports 406a, as shown in FIG. 4.

TABLE 1

| Region | Landfill Gas Component | Weight Fraction In the Gas Mixture | Molecular or Atomic Weight |
|---|---|---|---|
| 402b | $CO_2$ | 30.0% | 44.01 |
| 402c | $H_2S$ | 3500 ppm | 34.08 |
| 402d | $O_2$ | 1.5% | 31.99 |
| 402e | $N_2$ | 24.5% | 28.01 |
| 402f | CO | 0.1% | 28.01 |
| 402g | $CH_4$ | 44.0% | 16.04 |

Embodiments of a process in accordance with the present invention can be operated within a duct, for example, in a stack that is downstream to a duct, or in some other system of downstream conveyance that conducts the gases either for further separation of gas by density, for use, for treatment, or for processing, or for release from the process. For example, methane gas may be conveyed to an engine or other point of combustion for recovering useful energy, sulfur compounds may be treated or recovered for use, and atmospheric gases including oxygen, nitrogen, and carbon dioxide can be recovered or released to the atmosphere.

Embodiments of a process in accordance with the present invention can be operated at any convenient temperature. Small variations in temperature are not critical. The operating temperature will normally be selected as the temperature at which all of the components to be separated are in the gas phase in the separator chamber. In the case of some materials, this may require relatively high temperatures, while in the case of materials which are normally gaseous at normal room temperature, normal room temperature can be used. In some cases, very low operating temperatures may be preferable. The range of operating temperatures is thus from about −50° to about 500° C., and preferably from about −20° to about 300° C.

If the difference in molecular or atomic weights of gas components are larger, it may be possible to effect a good separation in one stage. If the difference in molecular or atomic weights of gas components are small, it may be necessary to repeat the process in several stages, recovering the higher molecular weight or lower molecular weight fraction each time from the appropriate portion of the duct, and then recycling to a further stage.

Embodiments of the present invention may also be used to separate gas mixtures where precision and stringent requirements of separation efficiencies are low. For example, during extraction of siloxanes from separated landfill gases, loss of carbon dioxide from the main gas stream is acceptable. Similarly, during extraction hydrogen sulfide from main landfill gas stream, inclusion of small quantities of carbon dioxide (from the heavy gas stream) or some oxygen and nitrogen (from the light gas stream) is acceptable.

Gas separation system in accordance with one or more embodiments of the present invention can be formed of any suitable material that is resistant to corrosion by the gas mixtures to be separated under the operating conditions. Exemplary materials include stainless steel, aluminum/nickel/chromium alloys, titanium and titanium alloys, ceramic, glass, porcelain, nylon, polyfluorohydrocarbons (e.g., polytetrafluoroethylene and chlorotrifluoroethylene polymers), polyesters, polycarbonates, polyolefins (e.g., polyethylene, polypropylene, polybutylene), synthetic rubbers, phenol-formaldehyde, urea-formaldehyde, melamine-formaldehyde, polyoxymethylene, and the like.

It is thought that the gas separation system and method of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

I claim:

1. A method of separating a plurality of gas components from a gas mixture by action of centrifugal forces, comprising the steps of:
   receiving the gas mixture in one axial direction via an inlet duct;
   splitting the gas mixture into a plurality of streams through the inlet duct;
   accelerating the plurality of streams in another radial direction by action of the centrifugal
   forces;
   forcing the plurality of streams through a first gas discharge outlet; and
   feeding at least one of the plurality of gas components from the first discharge outlet through a second gas discharge outlet.

2. The method of claim 1, further comprising the step of separating at least one gas
   component from the plurality of gas components forced through the first gas discharge outlet.

3. The method of claim 2, wherein the separating step further comprises guiding the at
   least one of the plurality of gas components forced through the first gas discharge outlet against a baffle surface.

4. The method of claim 1, wherein the gas mixture is drawn through an
   inlet pipe by
   induced draft.

5. The method of claim 2, further comprising feeding the plurality of gas components
remaining after separating the at least one gas component to the gas mixture being received.

6. The method of claim 2, wherein the molecular weight of the at least one gas
component of the plurality of gas components is the heaviest in the gas mixture.

7. The method of claim 1, wherein receiving the gas mixture comprises drawing the gas mixture in one axial direction by suction.

8. The method of claim 1, wherein receiving the gas mixture comprises forcing the gas mixture in one axial direction by pressure.

9. The method of claim 8, wherein the pressure may be applied by at least one of fan, pump, and blower.

10. A method of separating a plurality of gas components from a gas mixture by action of centrifugal forces, comprising the steps of:
receiving the gas mixture into a centrifugal fan device in an axial direction through an inlet duct;
accelerating the gas mixture in a radial direction by action of centrifugal forces to form a plurality of gas streams through the inlet duct, wherein each gas stream comprises at least one of the
plurality of gas components;
forcing the plurality of gas streams through a first discharge outlet;
guiding at least one of the plurality of gas streams forced through the first discharge outlet against a baffle surface, wherein contact with the baffle surface forces the at least one gas stream out of the first discharge outlet through a second discharge outlet; and
conducting the remaining of the plurality of gas streams out of the first discharge outlet through a third discharge outlet.

11. The method of claim 10, further comprising feeding at least a first portion of the plurality of gas streams discharged through the third discharge outlet to the gas mixture being received into the centrifugal fan.

12. The method of claim 10, wherein the at least one gas stream discharged through the second discharge outlet comprises the at least one gas component having the highest molecular weight in the gas mixture.

13. The method of claim 10, wherein receiving the gas mixture into the centrifugal fan comprises drawing the gas mixture in the axial direction by suction.

14. The method of claim 10, wherein receiving the gas mixture into the centrifugal fan comprises forcing the gas mixture in the axial direction by pressure.

15. The method of claim 14, wherein the pressure may be applied by at least one of fan, pump, and blower.

16. A system for separating a plurality of gaseous components from a gaseous mixture, comprising:
a centrifugal fan device including a centrifugal fan having an axis and acting as a
rotatably driven pump impeller, said centrifugal fan device having:
a inlet for receiving gas mixture, wherein the inlet separates the gas mixture into a plurality of gaseous components and is located in the vicinity of the axis of the centrifugal fan, and
a gas outlet position tangentially on fan periphery for forcing gas out of the fan
housing at an accelerated velocity;
a discharge outlet in the vicinity of the centrifugal fan periphery for receiving the
forced gas from the centrifugal fan, wherein the discharge outlet is located centrally relative
to the centrifugal fan gas outlet; and
a baffle surface positioned on the periphery of the discharge outlet for guiding at least one gas component of the plurality of gas components through a second discharge outlet.

17. The system of claim 16, wherein the length of the discharge outlet is from about 15 feet to about 25 feet.

18. The system of claim 16, wherein the axis of the discharge outlet form a curvature comprising an interior angle of about 60 degrees.

19. The system of claim 16, wherein the axis of the discharge outlet form a curvature comprising an interior angle of about 90 degrees.

20. The system of claim 16, wherein the centrifugal fan is an induced draft fan.

21. The system of claim 16, further comprising a drive for the centrifugal fan.

22. The system of claim 21, wherein the drive is an electric motor.

23. The system of claim 21, wherein the drive is a belt drive.

24. The system of claim 21, wherein the drive is a variable drive.

25. The system of claim 20, wherein the induced draft fan further comprises:
a hub; and
an impeller comprising a plurality of blades, each of the blades, without directly contacting the hub, spaced about an axis of rotation, wherein air enters axially through an upstream end of the fan and is discharged radially from the fan.

* * * * *